(12) United States Patent
Maruyama et al.

(10) Patent No.: US 8,373,940 B2
(45) Date of Patent: Feb. 12, 2013

(54) MAGNETIC HEAD HAVING A FACING ELECTRODE PAIR FOR GENERATING AN ELECTROMAGNETIC FIELD AND APPLYING ENERGY TO THE MAGNETIC RECORDING LAYER

(75) Inventors: Yohji Maruyama, Saitama (JP);
Nobumasa Nishiyama, Kanagawa (JP);
Masafumi Mochizuki, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 404 days.

(21) Appl. No.: 12/547,964

(22) Filed: Aug. 26, 2009

(65) Prior Publication Data
US 2010/0053812 A1 Mar. 4, 2010

(30) Foreign Application Priority Data
Aug. 27, 2008 (JP) ................. 2008-218866

(51) Int. Cl.
*G11B 5/02* (2006.01)
*G11B 5/127* (2006.01)
(52) U.S. Cl. .................. 360/59; 360/125.31
(58) Field of Classification Search ............ 360/59, 360/125.31, 125.74, 128
See application file for complete search history.

(56) References Cited

U.S. PATENT DOCUMENTS

| | | | |
|---|---|---|---|
| 6,771,445 B1 | 8/2004 | Hamann et al. | 360/59 |
| 6,785,092 B2 | 8/2004 | Covington et al. | 360/126 |
| 7,436,613 B2 * | 10/2008 | Takahashi et al. | 360/59 |
| 7,508,625 B2 * | 3/2009 | Takahashi et al. | 360/125.03 |
| 8,023,218 B2 * | 9/2011 | Zhou et al. | 360/59 |
| 2005/0023938 A1 | 2/2005 | Sato et al. | 310/363 |
| 2006/0114606 A1* | 6/2006 | Ide | 360/125 |
| 2007/0253106 A1 | 11/2007 | Sato et al. | 360/126 |
| 2008/0019040 A1 | 1/2008 | Zhu et al. | 360/110 |
| 2008/0024910 A1 | 1/2008 | Seigler | |

FOREIGN PATENT DOCUMENTS

| | | |
|---|---|---|
| CN | 101046972 A | 10/2007 |
| CN | 101114483 A | 1/2008 |
| JP | 2005/525663 | 8/2005 |
| WO | 03/010758 | 2/2003 |

OTHER PUBLICATIONS

Chinese Office Action Summary from application No. 2009/10170435.X dated Sep. 14, 2010 (no translation).
Zhu, Jian-Gang et al., "Microwave Assisted Magnetic Recording" IEEE Transactions on Magnetics,vol. 44, No. 1, Jan. 1, 2008, p. 125-131.
Chinese Office Action from application No. 200910170435.X dated Mar. 19, 2012 (no translation).

* cited by examiner

*Primary Examiner* — Allen Heinz
(74) *Attorney, Agent, or Firm* — Zilka-Kotab, PC

(57) ABSTRACT

According to one embodiment, a magnetic head for recording magnetic data by changing the magnetization direction of a magnetic recording layer of a magnetic medium comprises a magnetic pole for generating a magnetic field to change the magnetization direction of the magnetic recording layer, and a facing electrode pair for generating an electromagnetic field and applying energy to the magnetic recording layer to assist the change of the magnetization direction of the magnetic recording layer caused by the magnetic field from the magnetic pole. Other embodiments are also presented.

18 Claims, 7 Drawing Sheets

(a)

(b)

(a)

(b)

MAGNETIC HEAD HAVING A FACING ELECTRODE PAIR FOR GENERATING AN ELECTROMAGNETIC FIELD AND APPLYING ENERGY TO THE MAGNETIC RECORDING LAYER

RELATED APPLICATIONS

The present application claims the priority of a Japanese Patent Application filed Aug. 27, 2008 under Appl. No. 2008-218866, which is incorporated herein by reference.

FIELD OF THE INVENTION

The present invention relates to magnetic heads, and in particular, relates to structures of magnetic recording heads which are suitable for recording high-density magnetic information onto a magnetic recording layer.

BACKGROUND OF THE INVENTION

In storage (recording) devices for information, equipment, semiconductor memory, and magnetic memory are mainly used. For short access time, semiconductor memory are used in internal storage devices and for larger capacity and non-volatility, magnetic disk devices are used in external storage devices. Storage capacity is an important index to indicate the capability of magnetic disk devices. Magnetic disk devices with huge capacity and of compact size have been increasingly requested by the market with recent developments of the information society. Perpendicular recording is a recording scheme suitable for this demand.

To promote higher recording density in the perpendicular recording, more minute recording bits are desired. Developing more minute recording bits, however, reduces the thermal stability of recording bits so that the non-volatility of magnetic information may be lost thus resulting in the memory being unsatisfactory. Accordingly, to ensure the thermal stability, recording media with higher anisotropy in the perpendicular direction are desired. It has generally been known that recording media with high anisotropy are difficult to record because of the enhanced coercivity involved.

To address this problem, a solution has been disclosed in the Published Jap. Translation of PCT International Appl. No. 2005-525663. This document describes a recording system which is comprised of a first write magnetic pole for reversing a magnetic field in accordance with writing information and a second write magnetic pole for producing a high-frequency magnetic field. This document further discloses a technique to obtain an effective magnetic reversal field which is stronger than the magnetic field from the first write magnetic poles by the synthetic magnetic field of the two magnetic poles (the second write magnetic pole assists the recording operation). In particular, a feature of this disclosure is the second write magnetic pole disposed between the first write magnetic pole and a free layer whose magnetization is controlled by spin transfer torque.

In a conventional head structure, a second write magnetic pole for generating an assisting magnetic field is affected by the magnetic field generated by a first write magnetic pole, and the oscillation of an element which is connected to the second write magnetic pole is also affected by a magnetic field from the first write magnetic pole. Hence, the oscillation frequency varies, and therefore, intended frequency control is difficult to perform.

SUMMARY OF THE INVENTION

According to one embodiment, a magnetic head for recording magnetic data by changing the magnetization direction of a magnetic recording layer of a magnetic medium comprises a magnetic pole for generating a magnetic field to change the magnetization direction of the magnetic recording layer, and a facing electrode pair for generating an electromagnetic field and applying energy to the magnetic recording layer to assist the change of the magnetization direction of the magnetic recording layer caused by the magnetic field from the magnetic pole.

Other embodiments are also described in light of the claimed invention.

DETAILED DESCRIPTION

Figure 1:
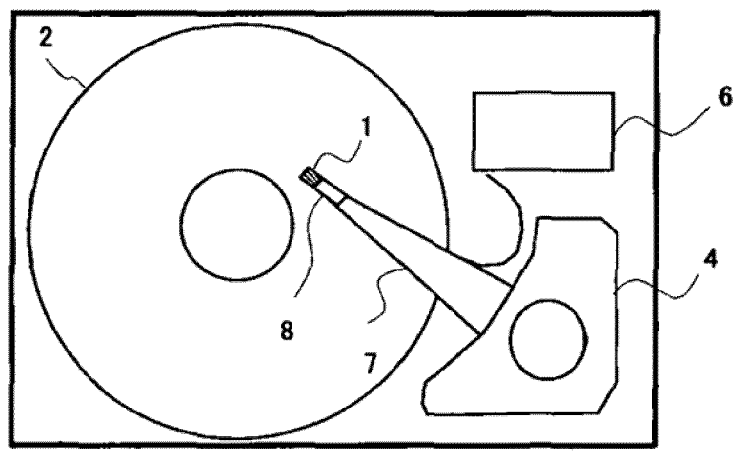
FIG. 1 includes diagrams schematically depicting the structure of a magnetic disk device according to one embodiment.
Figure 1:
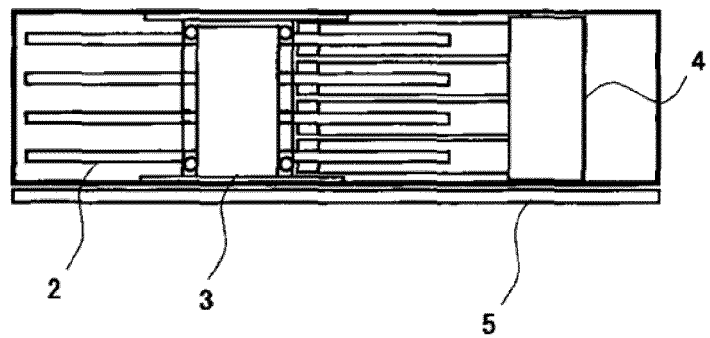

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

It has been found that the technique described in Published Jap. Translation of PCT International Appl. No. 2005-525663 has the following problem. When the second write magnetic pole is placed adjacent to the first write magnetic pole, the second write magnetic pole is magnetically saturated by the magnetic field produced by the first write magnetic pole so that change in the magnetization induced by spin-flip is difficult to achieve stably. Similarly, the free layer whose magnetization is controlled by spin transfer torque is affected by the magnetic field of the first write magnetic pole so that the flux transition frequency varies, thereby causing a problem where intended frequency control is difficult.

Hence, the second write magnetic pole is placed more away from the first magnetic pole and/or a magnetic shield is provided in some magnetic heads. As the effective distance between the first write magnetic pole and the second write magnetic pole is increased, however, a problem arises where the assisting magnetic field gets weakened. Accordingly, writing to a recording medium with a high coercivity, which is one of the goals of the claimed invention, becomes difficult and a magnetic disk device with high density is not consistently accomplished.

Accordingly, one object of the present invention is to provide a magnetic head suitable for high-density recording by accomplishing producing a record assisting electromagnetic field which is not substantially affected by the write pole. Thereby, a magnetic disk device with high density and huge capacity can be accomplished.

One approach to accomplish this goal is a magnetic head for recording magnetic data which can change the magnetization direction of a magnetic recording layer of a magnetic medium. The magnetic head comprises a magnetic pole for generating a magnetic field to change the magnetization direction of the magnetic recording layer, and a facing electrode pair for generating an electromagnetic field and applying energy to the magnetic recording layer to assist the change of the magnetization direction of the magnetic recording layer caused by the magnetic field from the magnetic pole. In this regard, since the electromagnetic field for assisting magnetization reversal in the recording medium is the magnetic field component included in the electromagnetic field component from the facing electrode pair, the assisting electromagnetic field can be effectively applied to the recording medium without being affected by the magnetic field from the magnetic pole which dominates recording of magnetic information.

In one preferred embodiment, the facing electrode pair is comprised of two electrode plates arranged in a direction along a recording track, and an end of the magnetic pole closer to the magnetic recording layer is located between the two electrode plates. Thereby, an effective overlap of the recording magnetic field with the assisting electromagnetic field can be accomplished. It is preferable that the magnetic recording layer have anisotropy in the direction perpendicular to a film surface of the layer, the magnetic pole being a main pole which defines the width of a recording track of the magnetic recording layer, the facing electrode pair being comprised of two electrode plates arranged in a direction along a recording track, and an end of the magnetic pole being closer to the magnetic recording layer being located between the two electrode plates. Particularly, in the perpendicular magnetic recording for high-density recording, an effective overlap of the recording magnetic field with the assisting electromagnetic field can be accomplished. More preferably, at least a part of the main pole may be embedded in either one of the two electrode plates. This makes control of the overlap of the recording magnetic field with the assisting magnetic field easier.

In one example, a common surface to the one of the electrode plates and the main pole may face the other electrode plate of the two electrode plates. This makes the manufacturing of these magnetic heads facilitated to obtain high reliability. In an alternate example, a part of the magnetic pole may protrude from the one of the electrode plates toward the other electrode plate. This makes the intensity of the assisting electromagnetic field stronger. Besides, it is preferable that the electrode plate in which the main pole is embedded be an electrode plate on the trailing side. The trailing end of the main pole located between the electrodes allows the electromagnetic field to assist effectively.

Preferably, the disk drive device may further comprise an inductor connected in parallel to the facing electrode pair, and the resonant frequency of the capacitance of the facing electrode pair and the inductance of the inductor may range from about 10 GHz to about 50 GHz. Within this range, particularly effective assistance can be provided for magnetization reversal. Even more preferably, the capacitance of the facing electrode pair and the inductance of the inductor may range from about 20 GHz to about 40 GHz.

Hereinafter, a preferred embodiment to which the claimed invention has been applied will be described. For clarity of explanation, the following descriptions and accompanying drawings may contain omissions and simplifications as appropriate. Throughout the drawings, like components are denoted by the same reference numerals throughout, and their repetitive description is omitted if not necessary for clarity of explanation.

In one embodiment, the structure of the magnetic head has a feature in the recording head, which is a writing part of a magnetic head. The recording head of the present embodiment structurally comprises a magnetic pole for generating a magnetic recording field which changes the magnetization direction of a recording layer of a magnetic storage medium and a facing electrode pair. The facing electrode pair generates a high-frequency electromagnetic field to assist the magnetic recording field generated by a magnetic pole to change the magnetization direction. The high frequency electromagnetic field generated by the facing electrode pair is generally in the form of microwaves.

Energy from the high frequency electromagnetic field increases the potential energy in the magnetic recording layer to readily change the magnetization direction responsive to the magnetic recording field from the magnetic pole. In particular, since generation of high frequency electromagnetic field by the facing electrode pair is not affected by the magnetic field from a magnetic pole unlike the generation of an assisting magnetic field by a sub-magnetic pole, the facing electrode pair can generate an assisting electromagnetic field more effectively. The assisting electromagnetic field generated by the facing electrode pair can change the magnetization direction of the magnetic recording layer with high coercivity by the recording magnetic fields which is from the magnetic pole and changes in accordance with write signals, so that a magnetic disk device with high recording density can be accomplished.

For effective assistance by the high frequency electromagnetic field, the recording magnetic field by the magnetic pole overlaps the high frequency electromagnetic field generated by the facing electrode pair, according to one approach. To this end, it is preferable that a capacitor be placed adjacently to the magnetic pole. Between the adjacently placed magnetic pole and facing electrode pair, other active functional parts, for example, a heater element, a magnetoresistive effect element, etc., are not present. In a preferable arrangement to satisfy this adjacent placement, at least a portion of the end of the magnetic pole closer to the magnetic recording layer may be placed between two electrode plates constituting the facing electrode pair. Thereby, the magnetic pole and the facing electrode pair are adjacently placed to each other so that the electromagnetic field generated the capacitor can effectively overlap the recording magnetic field of the magnetic pole.

In the present embodiment, an insulating layer may be provided between the two electrodes of the facing electrode pair and the facing electrode pair may function to build up electric charge. In addition, the facing electrode pair may function to keep a resonant condition with the inductance component included in the same circuit. Accordingly, this facing electrode pair may generate an electromagnetic field and is referred to as a capacitor hereinafter. A preferable capacitor for generating an assisting electromagnetic field may be a parallel flat plate pair whose main surfaces face each other. To configure a capacitor, the two electrodes do not need to be flat plates or the two flat plates do not need to be parallel. To generate a desired electromagnetic field effectively, however, it is preferable to generate an assisting electromagnetic field with a parallel-flat-plate capacitor. Accordingly, hereinafter, a magnetic head with a parallel-flat-plate capacitor implemented will be described by way of example.

The recording assisted by an electromagnetic field from a capacitor in the present invention is applicable to both of the in-plane recording magnetic disk devices in which the recording magnetization is directed in the in-plane direction of the magnetic recording layer and the perpendicular recording magnetic disk devices in which the recording magnetization is directed perpendicularly to the magnetic recording layer. For higher recording density, however, the perpendicular recording scheme is superior and the present invention is particularly effective in the perpendicular magnetic recording scheme. Accordingly, hereinafter, a perpendicular recording magnetic disk device to which the present invention has been applied will be specifically described by way of example.

FIG. 1 depicts a general configuration of a perpendicular recording magnetic disk device according to one embodiment. FIG. 1(a) is a plan view of the magnetic disk device and FIG. 1(b) is a cross-sectional view of the magnetic disk device. Magnetic disks 2 as recording media are secured to a motor 3 and spin in recording and reproducing information. In the example of FIG. 1, four magnetic disks 2 are mounted.

A magnetic head slider 1 (hereinafter, a magnetic head) is supported by a rotary actuator 4 via an arm 7. The magnetic head 1 comprises a slider for flying above a spinning recording medium and a functional element part formed on a trailing end surface of the slider. A suspension 8 functions to support the magnetic head 1 above the recording medium 2 with a specific force. To process reproduction signals and to input and output information, a signal processing circuit 5 and a recording and reproducing circuit 6 are required; they are mounted on the device's main body.

The perpendicular recording scheme employs a medium having the easy axis of magnetization perpendicular to the recording surface. For a recording medium (magnetic disk) 2 of a magnetic disk device, a glass or Aluminum substrate is used. On the substrate, a magnetic thin film which forms a magnetic recording layer is deposited. The recording magnetic field from the main magnetic pole acts on the recording medium 2 to change the magnetization direction of the recording layer. Since the perpendicular magnetic recording requires this perpendicular magnetic field component to be used, a soft underlayer (SUL) is provided between the recording layer and the substrate.

To write magnetic information onto the recording medium 2, a functional part (writing part) having an electromagnetic converting function is used. To reproduce magnetic information, a functional part (reproducing part) utilizing a giant magnetoresistance phenomenon or an electromagnetic induction phenomenon is used. In the configuration of the present embodiment, the recording and reproducing circuit 6 particularly includes a high-frequency exciting circuit. A transmission line for transmitting high-frequency current and voltage waves from the exciting circuit is provided on the arm 7 and the suspension 8, and it functions at least to supply the capacitor mounted on the magnetic head 1 with electric current and voltage.

These functional parts are provided in the magnetic head 1, which is a component for input and output. The magnetic head 1 moves over the surface of the recording medium 2 with rotation of the rotary actuator 4, gets positioned at a specific place, then writes or reproduces magnetic information. An electric circuit for controlling these operations is provided with the above-mentioned signal processing circuit 5.

Hereinafter, the structure of the writing part which is mounted on the magnetic head 1 and has a record assisting function with a high frequency electromagnetic field will be described. For effective assistance to the magnetic recording, the frequency of the high frequency electromagnetic field generated by the capacitor is one of the reference parameters. According to a report in IEEE T. Mag. Vol. 44, No. 1, 2008, pp. 125-131 by Jian-Gang Zhu et al., an advantageous assisting effect arises when the normalized frequency w ranges from 0.2 to 0.8. w is determined from the gyromagnetic constant in the magnetization and the anisotropy field (Hk) of the recording medium.

For high-density recording media, one of the goals of the present invention, high anisotropic characteristic is desired: approximately from 13 KOe to 25 KOe. The gyromagnetic constant is assumed as $1.105 \times 10^5$, so that the desired w is figured out to range from $1.149 \times 10^{11}$ to $2.21 \times 10^{11}$. That is, in frequency, it ranges from about 18 GHz to about 35 GHz. The calculation by Jian-Gang Zhu et al. is a computer simulation; in actual recording media, it is necessary to consider the effects of the dispersion of Hk, the dispersion of exchange-coupling energy between crystal grains, the dispersion of reverse torque induced by saturation magnetic flux density dispersion, etc. Hence, in the following descriptions, a technique and a structure will be disclosed that are capable of covering a wider assistance spectrum ranging from about 10 GHz to about 50 GHz.

Figure 2:
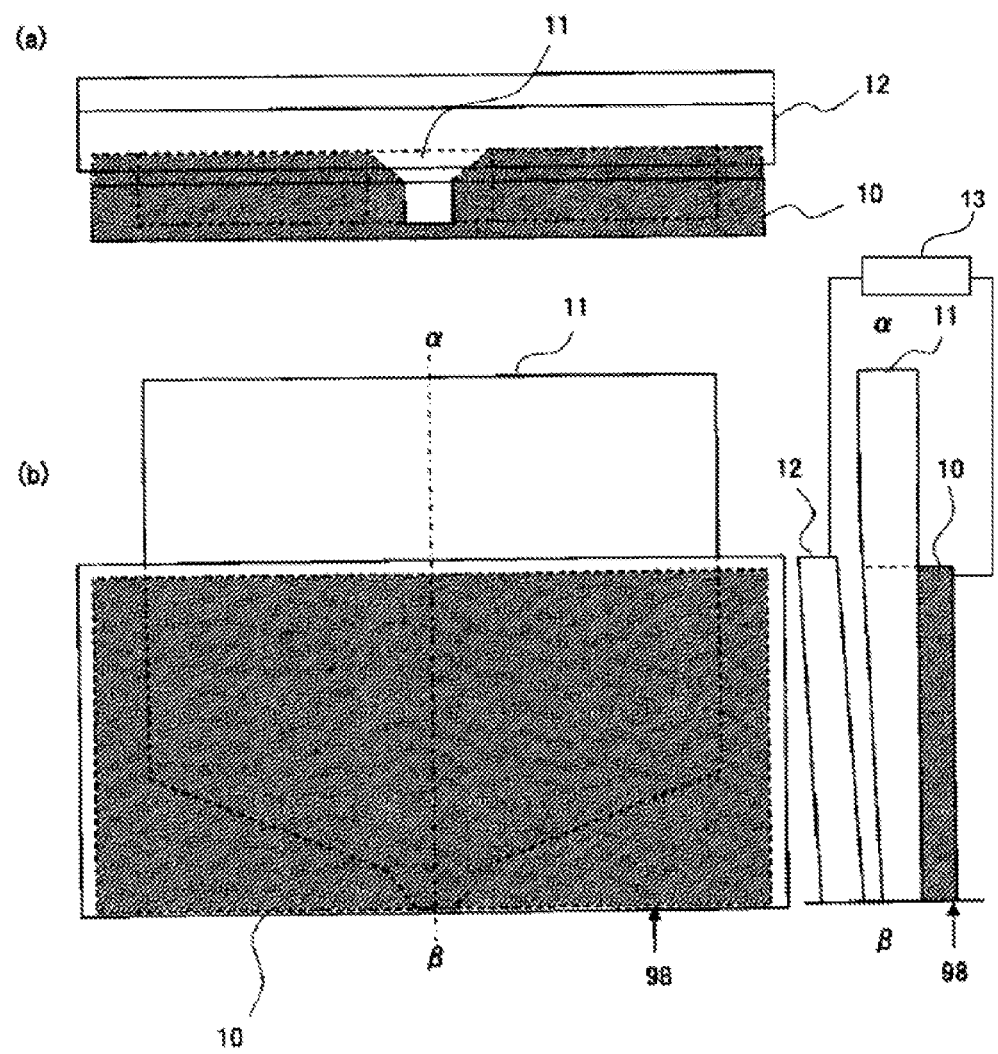
FIG. 2 includes diagrams schematically depicting the main part of a writing part of a magnetic head according to one embodiment.

FIG. 2 is an enlarged view of the main part of a writing part according to one embodiment. FIG. 2(a) is a view as viewed from a flying surface 98 for facing a recording medium, and FIG. 2(b) is a cross-sectional view of a main pole 11 along the center line of the film thickness as viewed two-dimensionally and a cross-sectional view of the main pole 11 along the center line α-β as viewed from the side. In the present example, the main pole 11 is elongated to the flying surface 98. Namely, the end surface of the main pole 11 is exposed to the flying surface 98 to reduce the spacing to the magnetic disk 2 provided within a parallel-flat-plate capacitor.

Non-magnetic parallel-flat-plate electrodes 10 and 12 are provided above and under the main pole 11 in such a manner to sandwich the main pole 11. The flat-plate electrode 10 is the electrode on the leading side, and the flat-plate electrode 12 is the electrode on the trailing side. Like the main pole 11, the two flat-plate electrodes 10 and 12 are elongated to the flying surface 98, their end surfaces are exposed to the flying surface 98 to reduce the spacing to the magnetic disk 2. The recording track width is defined by the width of the main pole 11 exposed to the flying surface 98.

In the present configuration, the main pole 11 is embedded in the flat-plate electrode 10 to have a common (flash) surface which faces the flat-plate electrode 12. The flat-plate electrode 10 is in direct contact with the main pole 11. In this way, since the surfaces of the flat-plate electrode 10 and the main pole 11 to face the flat-plate electrode 12 are flat (on the same plane), the capacitor's electrodes are placed with a uniform spacing. The flat-plate electrode 12 can be formed on the common surface to the main pole 11 and the flat-plate electrode 10 with an alumina film interposed, so that the manufacture can be facilitated. In addition, a little electro-current constriction in the capacitor provides high reliability.

As illustrated in FIG. 2, it is more preferable that the main pole 11 be embedded in the flat-plate electrode 10 on the leading side than in the flat-plate electrode 12 on the trailing side, according to one embodiment. Although magnetization reversal of the magnetic recording layer occurs on the leading side, the polarity of the main pole 11 on the trailing side is finally written into the medium and the recording is determined on the trailing side of the main pole 11. Accordingly, the trailing end of the main pole 11 between the flat-plate electrodes 10 and 12 causes effective overlap of the recording magnetic field with the assisting electromagnetic field to increase assisting effect.

The width of the main pole 11 on the flying surface side is not more than 50 nm, which is an appropriate size for recording magnetic information with high density. The width of the main pole 11 is expanded backward (the direction away from the flying surface 98), which is a shape to readily obtain a strong magnetic field in a smaller track width environment. Further, the film thickness of the main pole 11 is increased backward in the film thickness direction to ensure the magnetic field intensity. These sectional areas of the main pole 11 are reduced toward the flying surface 98 to obtain a required magnetic field even under a small track width condition of 50 nm or less. In particular, in the present invention, a taper of approximately 10 degrees is provided in the film thickness direction of the main pole 11. This tapered angle is not an essential requirement to accomplish the present invention, but it is a selection (design condition) to increase the intensity of the magnetic field from the main pole 11.

Recording to a high Kc medium (high coercivity medium, high Ku medium), which is one of the goals of the present embodiment, cannot be achieved only by a recording magnetic field from the main pole 11. Then, the present embodiment utilizes an assisting high-frequency electromagnetic field from a parallel-flat-plate capacitor as an electromagnetic field applying means. The specific structure of the parallel-flat-plate capacitor is as follows. For the parallel flat plates, for example, an Aluminum film of 50 nm in thickness is used. Alternately, a non-magnetic conductive film of a single element such as Cu, Ru, Rh, Pt, Ni, Ta, Ti, Cr, Pd, W, or the like, or an alloy film of these elements may be used in embodying the present invention with no problem in satisfying the non-magnetism and the conductivity. For corrosion resistance in processing magnetic heads, Ru, Ti, Ta, Cr, and Rh may be particularly preferred.

The flat-plate electrode 12 above (on the trailing side of) the main pole 11 is disposed along the taper of the main pole 11 with a certain space. Hence, on the common surface to the main pole 11 and the flat-plate electrode 10, the second flat-plate electrode 12 is formed with an alumina film of an insulating film interposed. The thickness of this alumina film defines the spacing between the parallel flat plates. For example, the thickness of the alumina film is 30 nm. A person skilled in the art will easily understand that this film thickness is determined depending on the required capacitance for the parallel-flat-plate capacitor. As noted above, preferably, the disk drive device includes an inductor 13 connected in parallel to the facing electrode pair, and the resonant frequency of the capacitance of the facing electrode pair and the inductance of the inductor may range from about 10 GHz to about 50 GHz. Within this range, particularly effective assistance can be provided for magnetization reversal. Even more preferably, the capacitance of the facing electrode pair and the inductance of the inductor may range from about 20 GHz to about 40 GHz.

Figure 3:
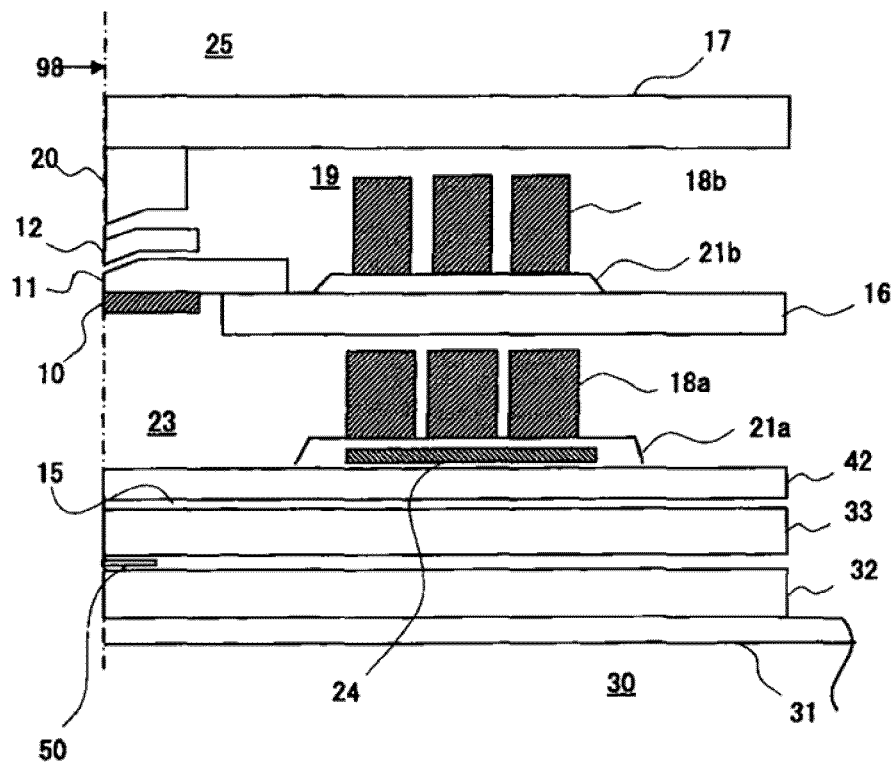
FIG. 3 is a cross-sectional view of the magnetic head according to one embodiment.

FIG. 3 is a cross-sectional view of the magnetic head 1 including the above-described main part. The information writing part and the information reproducing part are formed on a slider substrate 30. The slider substrate 30 is a component as the body of the magnetic head 1 which flies above the magnetic disk 2 shown in FIG. 1. The reproducing part is basically comprised of an insulating layer (underlayer) 31 provided on the slider substrate 30, a lower shield 32, an upper shield 33, and an element 50 to detect magnetic information.

The writing part is formed above the reproducing part. A layer which was deposited later is located at the upper side, and in the present example, the trailing side is the upper side. The writing part is separated from the reproducing part by a non-magnetic film 15. As already illustrated in FIG. 2, above and under the main pole 11, non-magnetic conductive films 10 and 12 which constitute the parallel-flat-plate capacitor are provided. Above the main pole 11, a soft magnetic film 20 is provided with the flat-plate electrode 12 interposed. The soft magnetic film 20 is magnetically connected to a soft magnetic film 17 to form a closed magnetic path. The soft magnetic film 17 is provided closer to a lower magnetic layer 16 at its rear end to form a magnetically connecting state with the lower magnetic layer 16. Between the soft magnetic film 17 and the lower magnetic layer 16, a soft magnetic film may be interposed. Furthermore, the lower magnetic layer 16 and the main pole 11 are magnetically connected.

Within the closed magnetic path configured by these layers, a coil 18b is placed. For the purpose of efficient introduction or a magnetic flux into the main pole 11, a soft magnetic film 42 is provided in parallel with the soft magnetic film 17 on the lower side. In addition, between the soft magnetic film 42 and the lower magnetic layer 16, a coil 18a is provided. To ensure electric insulation between these coils and the magnetic films, insulating layers 23, 21a, 21b, and 19 are provided to feed a specific electric current across the coils 18a and 18b. An alumina film can be used as the insulating layer 23, and a polymer resin film can be used as the insulating layer 19.

The electric current flowing across the coil 18b leads the magnetic flux to be introduced from the soft magnetic film 17 to the main pole 11 through the lower magnetic layer 16. Simultaneously, the electric current flowing across the coil 18a leads the lower magnetic flux to be introduced from the soft magnetic film 42 to the main pole 11 through the recording medium. Both of the magnetic fluxes act to strengthen the recording magnetic field generated by the main pole 11, but the flow of the lower magnetic flux in the drawing acts to weaken the effect of the recording magnetic field to the reproducing element 50. After forming the above-described all elements, an alumina film is coated as a non-magnetic and insulating protection film 25 to protect these elements. The alumina film is, for example, 25 μm in thickness.

The main pole 11 may be for example, made of a NiFeCo-based alloy with saturation flux density of 2.4 T and have the film thickness of approximately 16 nm on the flying surface 98 side. The soft magnetic film 20 may be made of a NiFe-based alloy with saturation flux density of 1.68 T, for example. The lower magnetic layer 16 may be, for example, a NiFe-based alloy film of 1.2 μm in thickness. The soft magnetic film 17 may be, for example, a NiFe-based alloy film of 1.0 μm in thickness. The coils 18 may be, for example, made of copper with the thickness of 2 μm. The insulating layer 19 may be, for example, made of polymer resin; and the other insulating layers and non-magnetic layers, alumina films.

In a preferred embodiment, a thermally assisted actuator is employed as a means to bring these recording part and reproducing part closer to the recording medium surface. Specifically, a heater 24 is provided under the coil 18a with an insulating layer 21a interposed. This heater 24 is connected to an electric power input part and is supplied with controlled electric power specified by a controller. The energizing causes the heater 24 to generate heat, which expands the material forming the recording and reproducing parts to partially protrude from the flying surface 98 toward the recording medium.

In general, this heater 24 is supplied with direct current and the capacitor for generating the assisting electromagnetic field of the present embodiment is energized by high-frequency electric power. If the heater 24 is energized with the high-frequency electric power, functional disorder does not occur to the heater 24. Therefore, if there coexist the need to activate the heater 24 and the need for the capacitor's assisting electromagnetic field together at the time of recording operation, the heater 24 and the capacitor may be connected in parallel to work.

In this case, a certain power distribution circuit (comprised of a resistor circuit and an inductance circuit (inductor)) may be used, but forming these within the magnetic head 1 does not cause any problem. This composite configuration has an advantageous effect in simplification of the power supply means for generation of the assisting electromagnetic field and the power supply means for protrusion of the heater 24 (fly-height control). This is advantageous mainly in reducing the number of terminals in the magnetic head slider and the number of lines on a suspension.

As described above, the present embodiment has a feature in the capacitor which is placed adjacent to the magnetic pole for generating a recording magnetic field and generates a high-frequency assisting electromagnetic field. Herein below, detailed descriptions will be given on this capacitor. In a preferred example in FIG. 2, the main pole 11 may be located between two flat-plate electrodes 10 and 12 which constitute the capacitor. Another way of placing the capacitor adjacent to the main pole 11 is to place the main pole 11 outside of the capacitor, but preferably, the main pole 11 should be disposed within the capacitor.

The magnetic field by the capacitor is generated inside between the parallel flat plates 10 and 12 (the thickness area is weak in magnetic field), and the magnetic field from the main pole 11 becomes stronger at the outside (which is explained as an effect of the demagnetizing field). Therefore, if the main pole 11 is placed outside the capacitor, a ferromagnetic field area from the main pole 11 does not overlap a ferromagnetic field area from the capacitor, so that assisted recording with high efficiency becomes unavailable. To this end, it is preferable that the main pole 11 be placed within the capacitor. Accordingly, in the in-plane recording scheme, it is preferable that both of the upper pole and the lower pole for generating recording magnetic fields be located between the flat-plate electrodes 10 and 12 of the capacitor.

Figure 4:
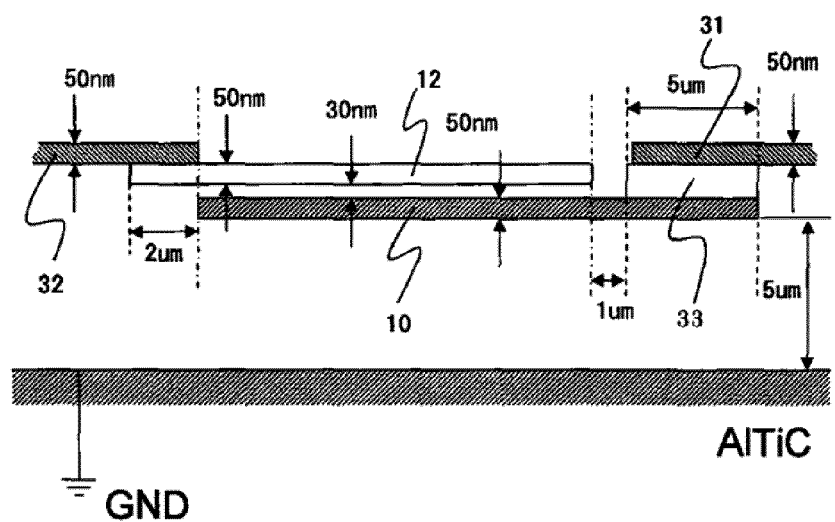
FIG. 4 is a diagram depicting the configuration used in designing the function of a parallel-flat-plate capacitor according to one embodiment.

FIG. 4 depicts the configuration which was used in functional designing of the parallel-flat-plate capacitor. The functional parts of the capacitor are formed on alumina-titanium carbide (AlTiC) substrate, which is a substrate of the magnetic head 1. The spacing between the lower flat plate 10 and the AlTiC is 5 μm (assuming that the infill is alumina). This is because the reproducing part should be placed in this space. Between the lower flat plate 10 and the upper flat plate 12, a gap of about 30 nm may be provided. In this model, a tape of the main pole 11 is not provided (the gap between the parallel flat plates is not narrowed above the flying surface).

The thicknesses of both the flat plates 10 and 12 may be about 50 nm. With variation of the widths of the parallel flat plates 10 and 12 from about 150 μm to about 500 μm, the characteristics were measured. Similarly, since the lengths in the depth of the parallel flat plates 10 and 12 are a parameter to determine the capacitance between the parallel flat plates, they were varied from 1 μm to 7 μm. To the parallel flat plates, electrodes 31 and 32, and a connecting part 33 which connects the electrode 31 and the lower flat plate 10 are connected, which allows high-frequency electric power to be applied. The gap between the upper and the lower parallel flat plates is filled with an alumina film and the main pole is disposed inside thereof. Since the main pole has conductivity, the effective gap becomes narrower in the area where the main pole is present.

Figure 5:
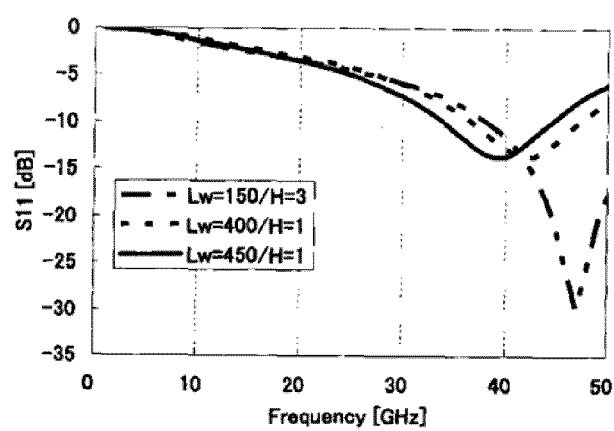
FIG. 5 depicts calculated results of reflected powers of various parallel-flat-plate capacitors used according to one embodiment.

FIG. 5 illustrates calculation results (design basic data) which were used in embodying the present invention with the above-described model. FIG. 5 shows results on parallel plates of 150 μm in width and 3 μm in depth, those of 400 μm in width and 1 μm in depth, and those of 450 μm in width and 1 μm in depth. In FIG. 5, the horizontal axis represents the frequency and the vertical axis represents S11 values (energy of reflected waves).

From the results, it has been revealed that every result has a down peak. The peak position indicates that the reflected power is the lowest and that electric power (electromagnetic waves by displacement current) has been discharged from the capacitor at the frequency condition. The magnitude of loss can be calculated from the resonant condition determined by the capacitance of the parallel-flat-plate capacitor and the inductance and the resistances (of the DC and of the high frequency) of the wiring which is connected in series with the parallel-flat-plate capacitor.

In the present calculation, since the inductance and the resistance of the wiring are unchanged, the result on the parallel flat plates of 150 μm in width and 3 μm in depth shows the least reflected electric power, indicating generation of high frequency with high efficiency. To keep the same condition, it is needless to say that electric power at the resonant frequency should be supplied to the magnetic head. Besides, it is well known that the assisting effect is increased by overlapping the frequency with the resonant frequency of the magnetization of the recording medium.

The results in FIG. 5 reveal that the resonant condition in the present embodiment is determined by the width and the depth of the parallel flat plates. A person skilled in the art will easily understand that design can also be achieved based on the spacing between the parallel flat plates, the dielectric constant of the infill, and the inductance and the resistance of the conductor connected to the capacitor in series. To obtain a lower reflection condition (higher efficiency of the electromagnetic waves), a person skilled in the art can easily understand technical matters such that inductance in the serial connection should be reduced, that inductance should be provided in parallel, that electric resistance of the conductor should be reduced, that conductance in the parallel flat plates should be increased and eddy-current loss be reduced, and the like.

In a conventional technique, oscillation of the element which is connected to a second recording magnetic field application means and whose magnetization is controlled by spin transfer torque determines the frequency to be applied. Hence, the oscillation frequency may disadvantageously change depending on the finished quality of the element. In contrast, in the configuration of the present invention, if the frequency to be applied from the outside is matched to the spin resonance frequency of the medium's magnetization around the structurally determined resonance point, any practical problem did not arise even though considering some inefficiency.

Figure 6:
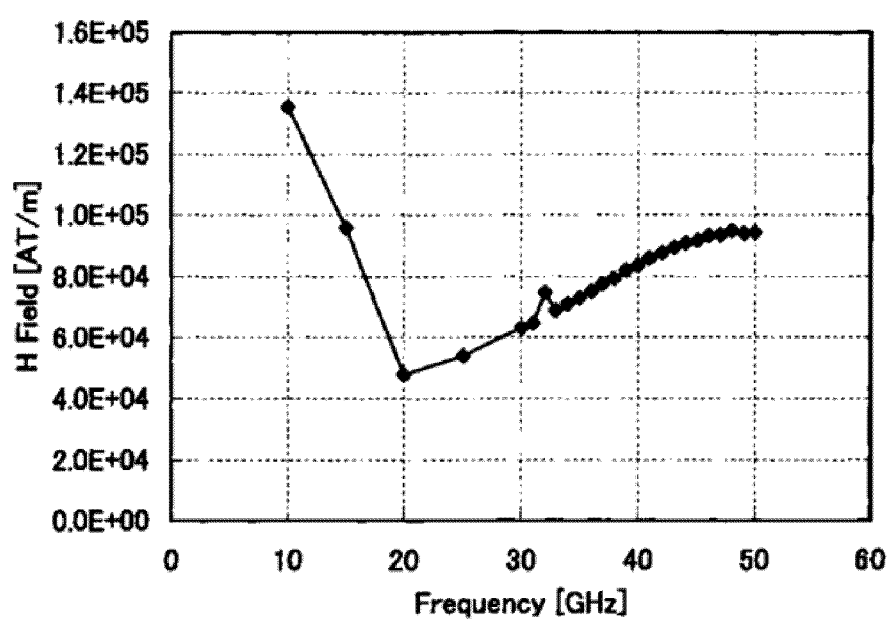
FIG. 6 depicts calculated results of intensities of high frequency magnetic fields from the parallel-flat-plate capacitor according to one embodiment.

FIG. 6 shows values of high frequency magnetic field generated in the configuration of the parallel flat plates of 150 μm in width and 3 μm in depth. It is assumed that the measurement point of the magnetic field is at the center of the film thickness of the recording layer of the recording medium and 15 nm above the flying surface. The horizontal axis of the drawing represents the frequency, and the vertical axis represents the magnetic field intensity. The drawing reveals that the magnetic field of the capacitor tends to decrease up to about 20 GHz and tends to increase from about 20 GHz or more. Since the capacitor oscillates at about 47 GHz, under the same frequency condition, a high-frequency magnetic field with field intensity of $9.5\times10^4$ (AT/m) (1.2 KOe) is generated. It is supposed that the magnetic recording scheme utilizing the second assisting recording requires a magnetic field of approximately 500 Oe or more, and 1.2 KOe, which is the value obtained by one embodiment, sufficiently satisfies this condition.

Figure 7:
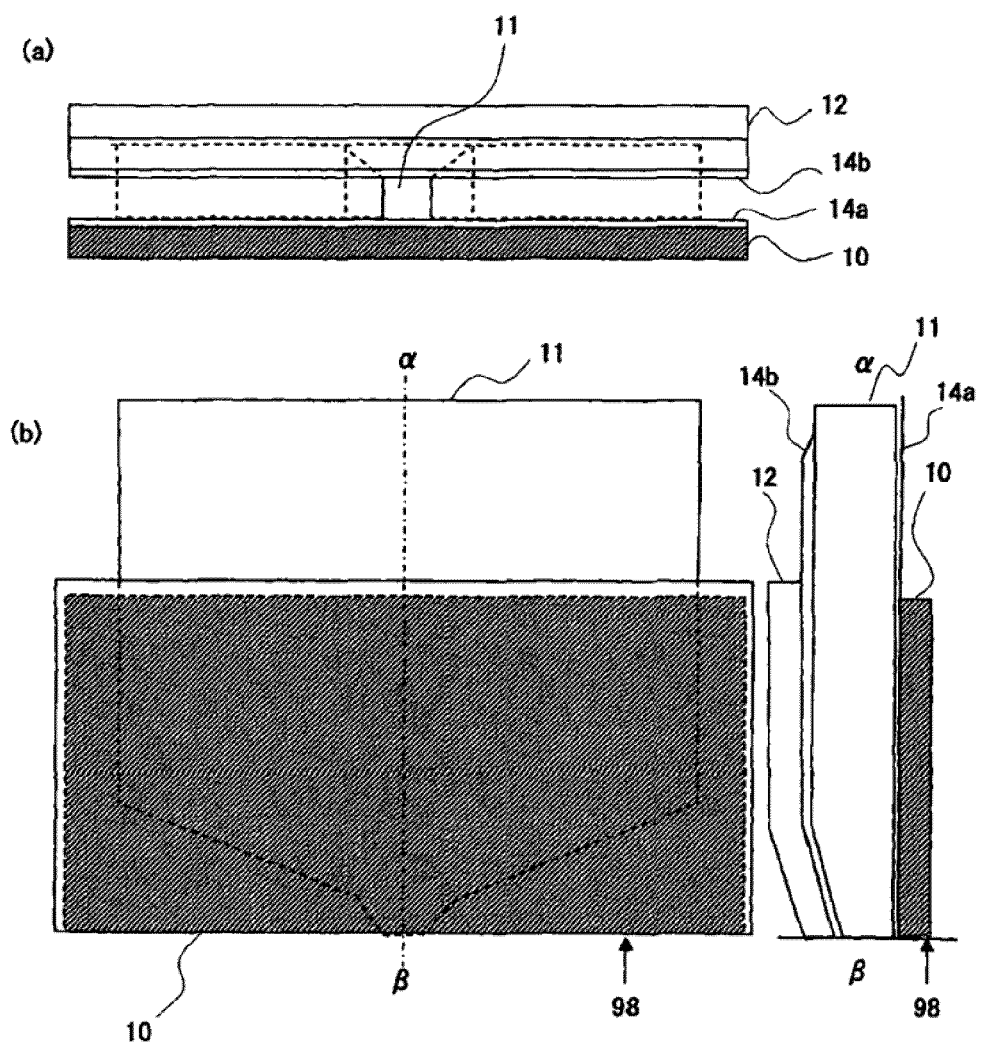
FIG. 7 includes diagrams schematically depicting the structure of the writing part of a magnetic head according to one embodiment.

Herein below, another preferable structure of the recording head as writing part will be described. As to the configuration in which the main pole is placed within the parallel flat plate capacitor, various structures can be thought of other than the structure described with reference to FIG. 2. Typical examples will be described as follows. FIG. 7 is enlarged views of the main part of a writing part having another preferred configuration. FIG. 7(*a*) is a view as viewed from a flying surface for facing a recording medium, and FIG. 7(*b*) is a cross-sectional view of a main pole 11 along the center line of the film thickness as viewed two-dimensionally and a cross-sectional view of the main pole 11 along the center line α-β as viewed from the side.

The main pole 11 is elongated to the flying surface 98. In the present configuration, non-magnetic parallel-flat-plate electrodes 10 and 12 are provided with non-magnetic layers 14*a* and 14*b* interposed in the up-down direction sandwiching the main pole 11. As the non-magnetic and insulating stacked films 14*a* and 14*b*, for example, alumina films of about 7 nm in thickness may be used. In the present configuration, the spacing between the parallel flat-plate electrodes 10 and 12 is smaller in the area where the main pole 11 is disposed. This reduced spacing between the parallel flat plates has an effect to concentrate the displacement current flowing between the parallel flat plates 10 and 12 (equivalent current which flows in the capacitor) on the flying surface 98 side and is advantageous in increasing the intensity of the magnetic field induced by the displacement current. The spacing between the parallel flat plates above the flying surface 98 may be, for example, approximately 30 nm.

In this regard, even if the non-magnetic and insulating stacked films 14*a* and 14*b* are partly thicker, such a configuration does not cause any problem in the present embodiment. For example, the films made thicker backward with respect to the flying surface 98 can consequently achieve a configuration in which the space between the parallel flat plates is reduced on the flying surface 98 side. This configuration provides concentration of the displacement current on the flying surface 98 side; and as an effective result thereof, the assisting magnetic field can be strengthened.

Figure 8:
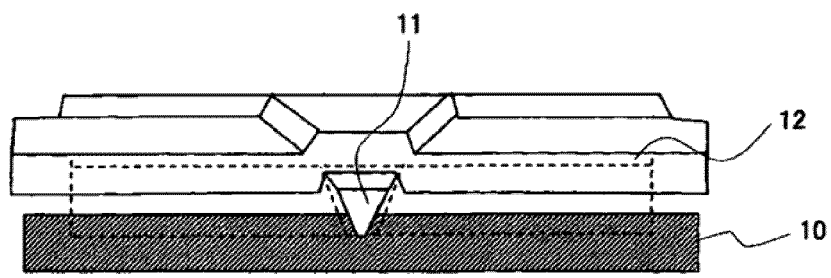
FIG. 8 includes diagrams schematically depicting the structure of the writing part of a magnetic head according to one embodiment.
Figure 8:
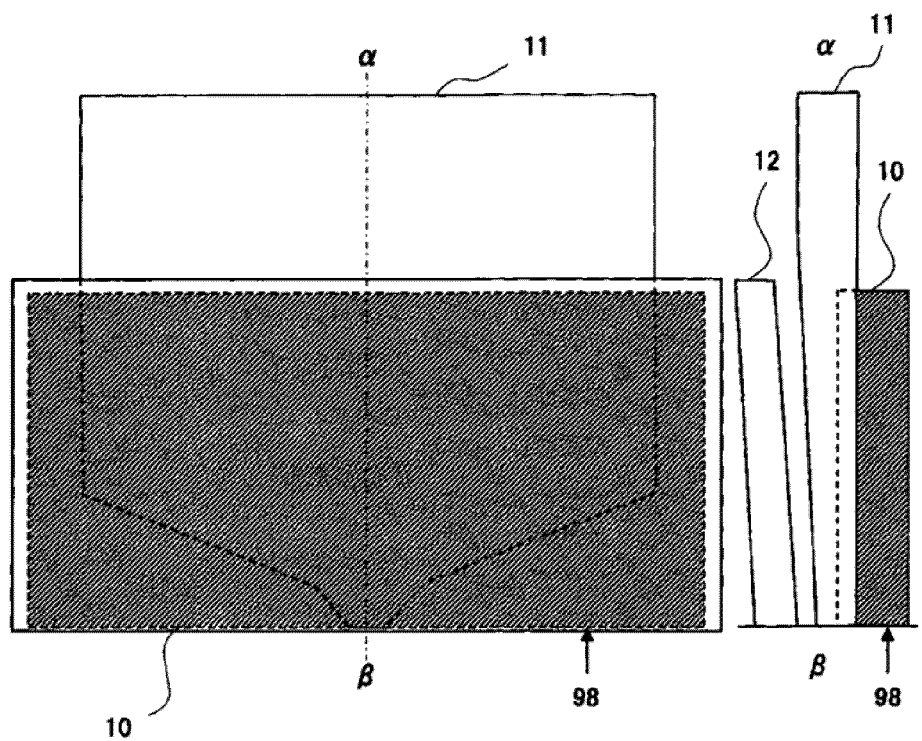

FIG. 8 is enlarged view of the main part of a writing part having still another preferred configuration, according to one embodiment. FIG. 8(*a*) is a view as viewed from a flying surface for facing a recording medium, and FIG. 8(*b*) is a cross-sectional view of a main pole 11 along the center line of the film thickness as viewed two-dimensionally and a cross-sectional view of the main pole 11 along the center line α-β as viewed from the side. As illustrated in FIG. 8, a part of the main pole 11 penetrates the flat-plate electrode 10 and a part of the main pole 11 protrudes from the flat-plate electrode 10 toward the facing electrode 12. In this way, a part of the main pole 11 protrudes from the surface of the flat-plate electrode 10 facing the other flat-plate electrode 12, which concentrates a current on the protruding part to strengthen the assisting electromagnetic field by the capacitor. The main pole 11 has an inversed trapezoidal cross-section which is distinctive in the perpendicular magnetic recording.

An insulating layer (for example, an alumina film of about 30 nm in thickness) is stacked thereon, and a flat-plate electrode 12 as a facing electrode is placed thereon. Since the lower electrode sharing a part of the main pole 11 has bumps and dips, the upper flat electrode 12 has unevenness along the bumps and dips. This unevenness can be removed by planarizing the upper flat plate 12 and it does not become any bar to embody the present invention.

One object of the inversed trapezoidal shaping of the main pole 11 is to bring an advantageous effect in reducing a fringe field to adjacent tracks like the perpendicular magnetic recording technology. Besides, since the magnetic field from the main pole concentrates on the upper part which has a large exposed area, it can match the center of the assisting electromagnetic field from the parallel flat plate electrodes better. It is easy to understand that the assisting electromagnetic field becomes the maximum between the parallel flat plates; a recording head with high efficiency can be accomplished by matching the field centers of this magnetic field with the magnetic field from the main pole 11. To this end, an insulating film is provided along the projecting main pole 11 with a uniform spacing, and the flat-plate electrode 12 is provided thereon. This configuration can accomplish a magnetic disk device with an especially high density track pitch.

As described above, by application of an assisting electromagnetic field from the capacitor, the write, head structure of the present embodiment can accomplish recording to a high Ku medium which cannot be accomplished with a single recording magnetic pole. With this effect, a magnetic disk device for high density recording exceeding 750 Gb/in$^2$ can be provided.

As set forth above, the embodiments have been described by way of example but the invention is not limited to the above embodiments. A person skilled in the art can easily modify, add, and/or convert the components in the above embodiment within the scope of the present invention. The present invention is applicable to a recording head which generates a parallel recording field in the recording layer as well as a perpendicular magnetic recording head with a single pole. It is preferable that the magnetic pole be placed in the capacitor for generating the assisting electromagnetic field, but the magnetic pole may be placed outside the capacitor and adjacent to one of the facing electrodes. If possible in designing, the capacitor and the recording magnetic pole may be placed away from each other and other functional parts may be placed between them.

The following list is a description of the reference numerals and signs, and is provided for quick reference to the references consistent throughout the various figures included herein.

1: magnetic head
2: recording medium
3: motor
4: rotary actuator
5: circuit board
6: recording and reproducing circuit 7: arm
8: suspension
10: lower parallel flat plate
11: main pole
12: upper parallel flat plate
14: non-magnetic insulating film
15, 19, 23: non-magnetic insulating films
16: lower magnetic layer
17: soft magnetic film
18: coils
20: soft magnetic film
30: slider substrate
32: lower shield
33: upper shield
50: magnetoresistive element
98: flying surface While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head for recording magnetic data by changing the magnetization direction of a magnetic recording layer of a magnetic medium, the magnetic head comprising:
   a magnetic pole for generating a magnetic field to change the magnetization direction of the magnetic recording layer; and
   a facing electrode pair and a mechanism connected to the electrode pair for generating an electromagnetic field between the electrode pair for applying energy to the magnetic recording layer to assist the change of the magnetization direction of the magnetic recording layer caused by the magnetic field from the magnetic pole.

2. The magnetic head according to claim 1, wherein the facing electrode pair is comprised of two electrode plates arranged in a direction along a recording track, and wherein an end of the magnetic pole closer to the magnetic recording layer is located between the two electrode plates.

3. The magnetic head according to claim 1, wherein:
   the magnetic recording layer has anisotropy in the direction perpendicular to a film surface of the layer;
   the magnetic pole is a main pole which defines the width of a recording track of the magnetic recording layer;
   the facing electrode pair is comprised of two electrode plates arranged in a direction along a recording track; and
   an end of the magnetic pole closer to the magnetic recording layer is located between the two electrode plates.

4. The magnetic head according to claim 3, wherein at least a part of the main pole is embedded in one of the two electrode plates.

5. The magnetic head according to claim 4, wherein a common surface to the one of the two electrode plates and the main pole faces the other electrode plate of the two electrode plates.

6. The magnetic head according to claim 4, wherein a part of the magnetic pole protrudes from the one of the two electrode plates toward the other electrode plate.

7. The magnetic head according to claim 3, wherein one of the two electrode plates is on a trailing side of the magnetic head.

8. The magnetic head according to claim 1, further comprising an inductor connected in parallel to the facing electrode pair, wherein a resonant frequency of a capacitance of the facing electrode pair and an inductance of the inductor ranges from about 10 GHz to about 50 GHz.

9. The magnetic head according to claim 1, wherein one of the electrodes is positioned between the pole and a soft magnetic film that is magnetically connected to the pole.

10. The magnetic head according to claim 1, wherein the electrodes sandwich the pole, wherein one of the electrodes is in electrical communication with the pole.

11. The magnetic head according to claim 10, further comprising an insulating layer between the pole and the other electrode.

12. A system, comprising: the magnetic head according to claim 1; the magnetic medium; and a recording and reproducing circuit.

13. A magnetic head comprising:
   a magnetic pole for generating a magnetic field to change a magnetization direction of portions of a magnetic recording layer; and
   an electrode pair sandwiching the magnetic pole and a mechanism connected to the electrode pair which is configured to generate an electromagnetic field between the electrode pair for applying energy to the magnetic recording layer to assist the change of the magnetization direction of the magnetic recording layer caused by the magnetic field from the magnetic pole.

14. The magnetic head according to claim 13, wherein the electrode pair is comprised of two electrode plates arranged in a direction along a recording track, and wherein, an end of the magnetic pole closer to the magnetic recording layer is located between the two electrode plates.

15. The magnetic head according to claim 13, wherein one of the electrodes is positioned between the pole and a soft magnetic film that is magnetically connected to the pole.

16. The magnetic head according to claim 13, wherein the electrodes sandwich the pole, wherein one of the electrodes is in electrical communication with the pole.

17. The magnetic head according to claim 16, further comprising an insulating layer between the pole and the other electrode.

18. A system, comprising: the magnetic head according to claim 13; the magnetic medium; and a recording and reproducing circuit.

* * * * *

UNITED STATES PATENT AND TRADEMARK OFFICE
CERTIFICATE OF CORRECTION

PATENT NO. : 8,373,940 B2
APPLICATION NO. : 12/547964
DATED : February 12, 2013
INVENTOR(S) : Maruyama et al.

Page 1 of 1

It is certified that error appears in the above-identified patent and that said Letters Patent is hereby corrected as shown below:

In the specification:

col. 8, line 32 replace "or" with --of--.

Signed and Sealed this
Fourteenth Day of May, 2013

Teresa Stanek Rea
*Acting Director of the United States Patent and Trademark Office*